UNITED STATES PATENT OFFICE.

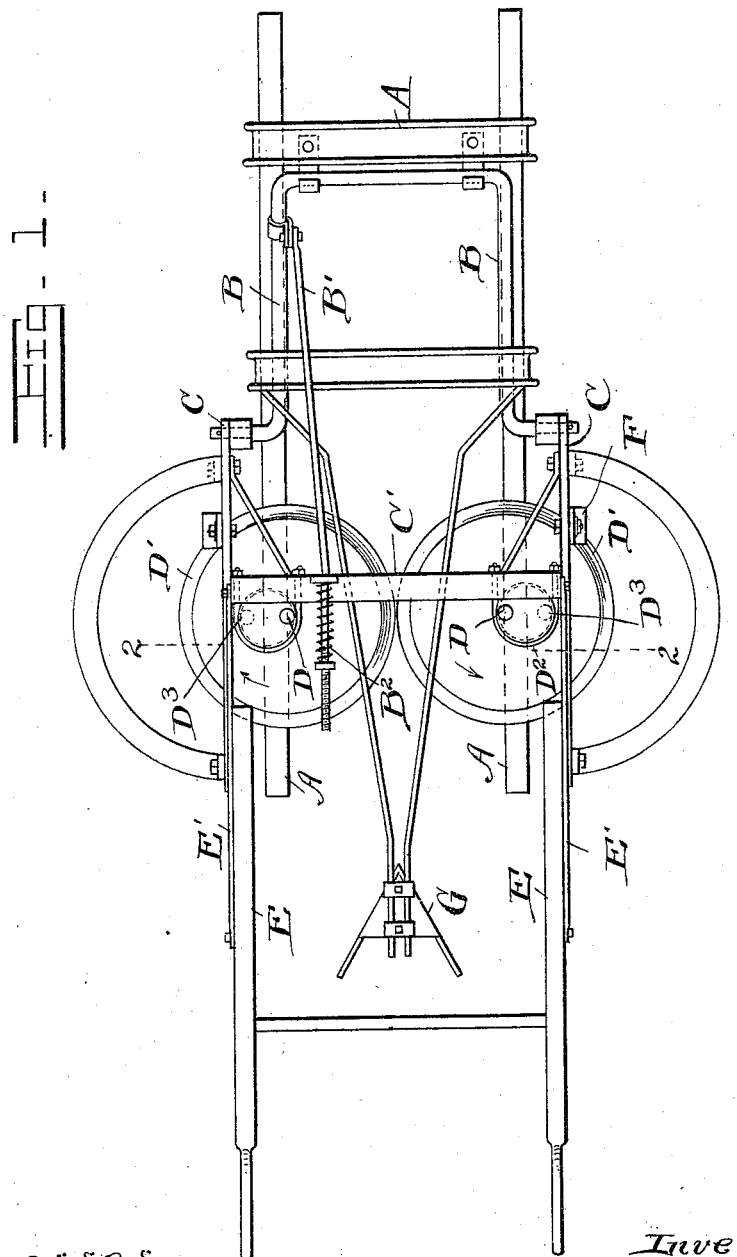

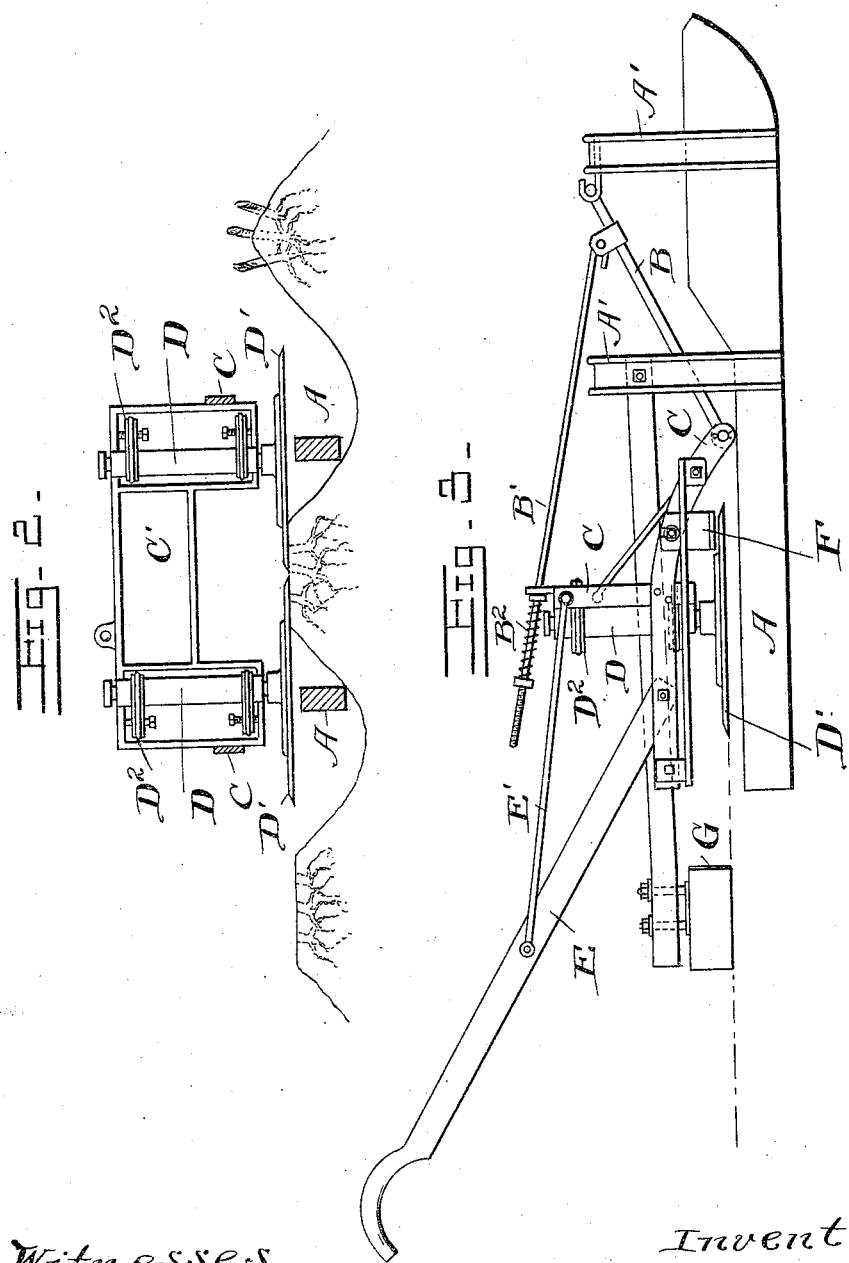

JOHN PAUL BALDWIN, OF BEREA, OHIO.

AGRICULTURAL IMPLEMENT.

975,109.  Specification of Letters Patent.  Patented Nov. 8, 1910.

Application filed June 3, 1909. Serial No. 499,978.

*To all whom it may concern:*

Be it known that I, JOHN P. BALDWIN, a citizen of the United States, residing at Berea, in the county of Cuyahoga and State of Ohio, have invented a certain new and useful Improvement in Agricultural Implements, of which the following is a full, clear, and exact description.

The present invention is directed to agricultural implements.

More particularly, the invention relates to apparatus for cutting into the earth for agricultural purposes, such apparatus, for example, as that used for shaving the crest of the ridges in which sugar cane is grown.

It is a fact well known among those familiar with the industry, that sugar cane will grow several successive seasons from the roots, notwithstanding the fact that it is harvested each season. Certain care, however, is necessary to secure the proper results, and part of the work necessary consists in cutting from the roots the dead stalk left after harvesting, so that the next season's growth may be given full opportunity. Inasmuch as the cane in this country is usually planted in ridged rows, the cutting away of the dead stalk has been accomplished most readily by running a shaving knife through the crest of the ridge. This procedure is called "shaving" among the planters and the various apparatus heretofore used for such purposes have been called "shavers." Considerable difficulty attends the use of those shavers heretofore known in the art in that these shaving knives follow the inequalities of the ground between the ridges, since they are more or less rigidly connected with the frame which travels in the hollows and astride the ridges. It has been found exceedingly difficult with these prior machines to maintain the shaving knife in the ridge at a sufficiently low depth when the forward end of the machine frame is raised by reason of the change in elevation of the line. A further and more serious difficulty is the tendency of a shaving knife to dig deeper and deeper into the ridge when it has been once given a downward inclination. Indeed it is ordinarily impossible to correct the location and pitch of the blade without stopping the apparatus and digging away the dirt to such an extent that the operator may lift the shaver to the proper height and start afresh.

It is the object of the present invention to obviate the difficulties enumerated as attendant upon the prior constructions and to produce a machine in which the shaving blade shall have a mobility such that the operator may maintain it at the proper depth regardless of the height of the ridges, and may change or correct the depth at which the blades work without being under the necessity for stopping the machine and digging away the overlying dirt.

The above objects and other useful advantages it will be seen are obtained by that embodiment of my invention described in the following specification with reference to the accompanying drawings, in which;

Figure 1 is a plan view of a shaver mounted on runners. Fig. 2 is a cross-section of the same on the line 2—2 of Fig. 1. Fig. 3 is a side elevation.

The frame of the apparatus comprises in the present instance a pair of runners A connected together by U-shape cross beams A', securely fastened thereto. Suitable traction means such as a chain or similar device is secured to the forward end of the frame. Pivotally hung on the forward cross beam are a pair of traction links B, B preferably constructed, as shown, of a single piece bent into the form of a bail. The rear end of each of these links is pivotally attached to the forward end of a draw bar C, there being two of these bars at opposite ends of a yoke frame C' in which are mounted the vertical spindles of a pair of shaving disks D'. These spindles are journaled in sleeves D passing through eccentrically perforated disks $D^2$ which are held by U bolts against horizontal pillow blocks interposed between the inner edge of the disk and the vertical face of the yoke frame. This mounting is preferred as it affords a convenient manner for properly spacing the spindles of the two disks so as to bring the disk edges close to each other regardless of the amount of wear and consequent reduction of their diameters. The adjustment of the axes of the disk spindles toward and from each other is secured simply by turning the circular blocks in which the spindles are eccentrically mounted so as to throw the spindles toward or away from the middle portion of the apparatus. In Fig. 1, for example, the circular blocks are shown turned so as to bring the spindles to their innermost position, the small dotted circle $D^3$ on the upper face of the blocks indicating the position of the shafts when the blocks are turned to throw them as far out as possible, this being their position when the disks are new and of the greatest diameter.

The controlling handles E are each secured to a draw bar and are themselves connected by a cross piece. A connecting rod E' is also secured to each handle bar and to the upper part of the yoke frame C'. For the purpose of holding the shafts of the disks vertically under the forward pull of the traction links, a steadying rod B' pivotally connected to the upper end of one of the links extends back through the upper part of the yoke frame passing loosely through a perforation therein. A compression spring $B^2$ surrounds the rod and bears against the rear face of the yoke frame, being held under compression by means of a nut on the rear end of the steadying rod. It will be seen that by this means the normal inclination of the axis of the disk shaft can be controlled so that it will ride properly without putting the burden upon the operator of constantly opposing any tendency of the tractive force to cause the disks to either dig into the material or pass out of the ground, yet leaving him at liberty to manipulate the disks at will.

A wiper F is preferably hung from the draw bars immediately over the forward edge of the disks so as to remove the dirt therefrom during operation. A fluke or scraper G for removing the dirt and stubble from the top of the ridge after the shavers have passed over the same is connected with one of the cross beams of the frame by any suitable link connection, permitting the fluke to drag in the proper line.

The apparatus above described, it will be seen, is free from those defects stated to be present in the prior machines. For example, in those machines mounted on wheels it has been found that when the front wheels run into a depression the disks will dip with the vehicle and tend to go deep in the ground and become so covered with dirt that they cannot be raised by the operator except in some such manner as digging off the dirt with a spade. Again, with the prior machines, it is found that in approaching a cross drain or the end of the rows where the top of the ridge slopes downward, it has not been possible to make the disk take hold and do its work on the last ten or fifteen feet of the row until the front wheels actually pass into the drain, after which the disks will probably cut too deep. The same sort of difficulty is experienced after passing a cross drain where the conditions are the reverse. All of these prior constructions known to me are so made that although the inclination of the disk shaft may be adjusted and set in the desired manner, nevertheless it cannot be manipulated by the operator after being once set,—that is to say, although an adjustment is provided there is no mobility of manipulation possible, the only movement which these disks have, ordinarily, being a practically vertical movement such as is permitted by two parallel links connecting the yoke frame with the forward end of the vehicle frame.

In operating my apparatus it will be seen that the disks are not subject to fluctuations and inclination by reason of depressions across the path of movement, and further, that the operator is able to tilt the disks either up or down according to the character of the ridge being cut, so that it need never come to pass that the disks become so embedded in the earth that it will be necessary to dig away the dirt from the same before they can be withdrawn. This is achieved by the manner of supporting the yoke frame in which the disk shafts are mounted, which frame may, at any time, be tilted back and forth and yet held normally in the desired inclination so as to take the burden of control off of the operator's hands.

Having thus described my invention, I claim:

1. Apparatus of the character described comprising a vehicle frame having a traction link pivotally connected thereto and connected to a draw bar so as to permit the inclination of the draw bar to be varied at will, said bar being fixed to a frame having journaled therein a plurality of cutting disks, a steadying rod extending from near the forward end of the vehicle frame to the disk carrying frame, spring connection between said rod and disk frame for holding the latter yieldingly in position and manipulating handles connected with said disk frame.

2. Apparatus of the character described having a vehicle frame, a transverse cutting disk with an upright spindle, link connection between the spindle and the vehicle frame permitting inclination of the spindle without adjustment, and a controlling handle connected to the spindle for inclining it at will.

3. Apparatus of the character described having a vehicle frame, a transverse cutting disk with an upright spindle, link connection between the spindle and the vehicle frame permitting inclination of the spindle without adjustment, and a controlling handle connected to the spindle for inclining it at will, a tension spring interposed between the spindle and the frame tending to hold the spindle in a definite upright position.

4. Apparatus of the character described having a vehicle frame, a transverse cutting disk with an upright spindle, link connection between the spindle and the vehicle frame permitting inclination of the spindle without adjustment, and a controlling handle connected to the spindle for inclining it at will, a tension spring interposed between the spindle and the frame tending to hold the spindle in a definite upright position, and means for regulating the tension of the spring.

5. Apparatus of the character described having a plurality of transverse disks with spindles eccentrically mounted in sleeves in a carrying frame, said sleeves being rotatable, and means for holding them in fixed position.

In testimony whereof, I hereunto affix my signature in the presence of two witnesses.

JOHN PAUL BALDWIN.

Witnesses:
F. R. WOOD,
JOE G. MOSS.